(12) United States Patent
Wildermuth

(10) Patent No.: US 6,240,969 B1
(45) Date of Patent: Jun. 5, 2001

(54) CONDUIT ELEMENT FOR EXHAUST GAS CONDUITS OF MOTOR VEHICLES

(75) Inventor: Eberhard Wildermuth, Pforzheim (DE)

(73) Assignee: Witzenmann GmbH Metallschlauch-Fabrik Pforzheim, Pforzheim (DE)

( * ) Notice: Subject to any disclaimer, the term of this patent is extended or adjusted under 35 U.S.C. 154(b) by 0 days.

(21) Appl. No.: 09/496,673

(22) Filed: Feb. 3, 2000

(30) Foreign Application Priority Data

Feb. 5, 1999 (DE) .............................. 299 01 957

(51) Int. Cl.⁷ .................................................. F16L 11/15
(52) U.S. Cl. .................... 138/122; 138/124; 138/143; 181/227
(58) Field of Search ..................... 138/122, 121, 138/114, 127, 124, 143, 147; 181/227, 249

(56) References Cited

U.S. PATENT DOCUMENTS

| | | | |
|---|---|---|---|
| 3,420,553 | * | 1/1969 | Poxon et al. ........................ 138/121 |
| 3,773,087 | * | 11/1973 | Katayama ............................ 138/121 |
| 3,901,539 | * | 8/1975 | Ijzerman .............................. 138/120 |
| 4,315,558 | * | 2/1982 | Katayama ............................ 138/121 |
| 4,345,430 | * | 8/1982 | Pallo et al. .......................... 138/122 |
| 4,854,416 | * | 8/1989 | Lalikos et al. ....................... 138/137 |
| 5,145,215 | * | 9/1992 | Udell ..................................... 285/49 |
| 5,456,291 | * | 10/1995 | Kunzmann .......................... 138/110 |
| 5,494,319 | * | 2/1996 | Thomas ............................... 138/122 |
| 5,660,419 | * | 8/1997 | Kim ..................................... 138/109 |
| 5,803,128 | * | 9/1998 | Reed .................................... 138/121 |
| 5,901,754 | * | 5/1999 | Elsässer et al. ..................... 138/121 |
| 6,062,266 | * | 5/2000 | Burkhardt ........................... 138/121 |

* cited by examiner

Primary Examiner—James Hook
(74) Attorney, Agent, or Firm—Akin, Gump, Strauss, Hauer & Feld, L.L.P.

(57) ABSTRACT

The invention concerns a conduit element made of metal for uncoupling high frequency vibrations in connection with exhaust gas conduits of motor vehicle internal combustion engines. To improve the uncoupling of these high frequency vibrations, the conduit element of the invention basically comprises a screw thread-shaped or annularly undulating short corrugated sheathing hose of high rigidity inserted into the exhaust gas conduit, as well as a knitted jacket placed on the waved corrugated sheathing hose segment in a force-locking or form-locking manner.

19 Claims, 3 Drawing Sheets

CONDUIT ELEMENT FOR EXHAUST GAS CONDUITS OF MOTOR VEHICLES

BACKGROUND OF THE INVENTION

The invention relates to a conduit element made of metal for uncoupling high frequency vibrations in connection with exhaust gas conduits of motor vehicle internal combustion engines.

It is known with exhaust gas conduits of motor vehicles to install in them a flexible conduit in the form of an undulating corrugated sheathing hose as an adapter, in order to absorb motions and vibrations and to uncouple them from propagation to adjacent components. Such motions and vibrations occur on the part of the elastically mounted drive machine as a consequence of load shifting reactions in normal driving operation or also on the basis of temperature-conditioned changes in length within the exhaust gas conduit. The propagation of these motions and vibrations to the vehicle should be avoided as far as possible, since the exhaust gas conduit is fastened on the vehicle floor, optionally with the interposition of elastic bracing elements.

These known adapters have a considerable length, in order to give them sufficient flexibility for accommodating relative motions between the parts of the exhaust gas conduit adjacent to them. Their rigidity, especially in the axial direction, is thus kept comparatively low, in order to prevent material fatigue and fractures resulting therefrom in the area of the adapter. Insofar as the adapters uncouple vibrations at the same time, this can consequently only apply for frequencies in the range up to about 200/250 Hz, since above this frequency range the adapters themselves are stimulated to internal vibrations. Here it can then be necessary to enclose the adapters along their undulated area by additional, vibration-damping materials in the form of metallic damping cushions or the like.

Now in the meantime, however, there increasingly arise high frequency vibrations caused on the part of the drive by the use of turbo-superchargers or compressors, which run at very high revolutions (rpm) and generate high frequency vibrations by their unbalances. In addition, owing to combustion processes associated with the opening of the discharge valves, high frequency pressure pulsations are generated in the exhaust gas elbow connecting to the motor as well as in the continuing exhaust gas installation. The known adapters are not capable of damping or uncoupling the body noise induced by these high frequency vibrations or pressure pulsations. Rather, the body noise in a frequency range of 1000 Hz to about 4000 Hz spreads beyond the exhaust gas installation and leads, chiefly in connection with housings of catalytic converters and mufflers, to the propagation of air-borne noise.

SUMMARY OF THE INVENTION

An object of the invention is to provide, in the exhaust gas conduit of motor vehicle internal combustion engines, a conduit element through which the high frequency vibrations mentioned above are uncouplable, and are thereby prevented from being propagated to the passenger space and from generating air-borne noise radiation.

The accomplishment of this objective is characterized according to the invention by a screw thread-shaped or annularly undulating short corrugated sheathing hose of high rigidity inserted into the exhaust gas conduit and a knitted jacket placed on the undulating corrugated sheathing hose segment in a force-fit or form-locking manner.

Such a conduit element of the invention, which is to be inserted into the exhaust gas conduit in addition to the adapter discussed at the outset, has the effect that henceforth even high frequency vibrations can be separately uncoupled as they arise, especially from the operation and the unbalances of turbo-superchargers or compressors. Here, there results from the shortness and high rigidity of the corrugated sheathing hose used that the exhaust gas conduit in its area needs no additional suspension or support, since the corrugated sheathing hose element can bear the adjacent elements of the exhaust gas conduit on its own.

With the construction of the invention there now results, however, also the possibility of using less well-balanced turbo-superchargers or compressors, so that the endeavors undertaken in considerable part for as good a balance as possible for these superchargers and the costs associated with them can be significantly reduced.

The number of waves of the corrugated sheathing hose in accordance with the invention can lie in a range from two to seven waves, wherein a wave count of three to five waves is advantageously used. Moreover, it has proven expedient to select the overall wall thickness of the corrugated sheathing hose in a range of 0.7 to 1.6 mm, preferably in a range of 0.9 to 1.2 mm.

The conduit element of the invention can be welded with at least one of the continuing parts of the exhaust gas conduit, for which it expediently has on at least one end a cylindrical connection end formed thereon in one piece. Directly on the engine side, however, a clamp connection known per se can also be advantageous, by which a separation point between exhaust gas installation and turbocharger or elbow is then simultaneously reached.

In order to give the corrugated sheathing hose an increased internal damping, it can be provided that the corrugated sheathing hose is constructed with multiple walls, wherein a three-or four-walled construction is advantageous, which yields the internal damping from the mutual friction of the individual wall layers. In addition, it can then also be provided for the wall layers of the corrugated sheathing hose to be produced from different materials, in order to use the damping properties of a respective material. It is only essential here is to heed the requirement that the component have the necessary temperature and corrosion resistance with respect to influences acting from inside and out.

As regards the rigidity of the corrugated sheathing hose, it is thus expedient to configure the construction overall so that the corrugated sheathing hose has an axial rigidity in the range of 1 KN/mm.

The vibration-damping knitted jacket can be constructed in multiple layers or as a hollow cylindrical knitted cushion, wherein it can be provided that the bore (i.e., inside) wall of the knitted jacket has a profile adapted to the shape of the wave crests of the corrugated sheathing hose. This profile, which supports the mutual form locking, can be impressed during manufacture of the knitted jacket, whereafter owing to its elasticity the knitted jacket can still be slid upon the corrugated sheathing hose despite this. The radial thickness of the knitted jacket or the knitted cushion can lie in a range of 2 to 5 mm, preferably in a range of 2 to 3 mm. It can also be provided that the knitted jacket is made of wires or fibers of different material, wherein the combination of wires of temperature- and corrosion-resistant steel, wires of copper and/or strands of glass fiber and/or tungsten and/or glass filaments come into consideration. For protection of the knitted jacket, it can be expedient to surround it with a solid casing, for example of a wire weave or in the form of a jacket of thin sheet metal.

Furthermore, it can be provided that the corrugated sheathing hose, proceeding from its end near the engine, has an inner protective tube of temperature- and corrosion-resistant material which does not contact the inner waves of the corrugated sheathing hose, in order to obtain a smooth exhaust gas flow and a temperature protection for the corrugated sheathing hose in a manner known per se.

BRIEF DESCRIPTION OF THE SEVERAL VIEWS OF THE DRAWINGS

As already mentioned, the conduit element of the invention can be provided in addition to the known flexible adapter. In this connection, it is advantageous to arrange the conduit element of the invention inside the exhaust gas conduit as close as possible to the engine, thus, viewed in the flow direction of the exhaust gas, in front of the flexible adapter, when using a turbo-supercharger thus directly behind the turbo-supercharger.

DETAILED DESCRIPTION OF THE INVENTION

Figure 1:
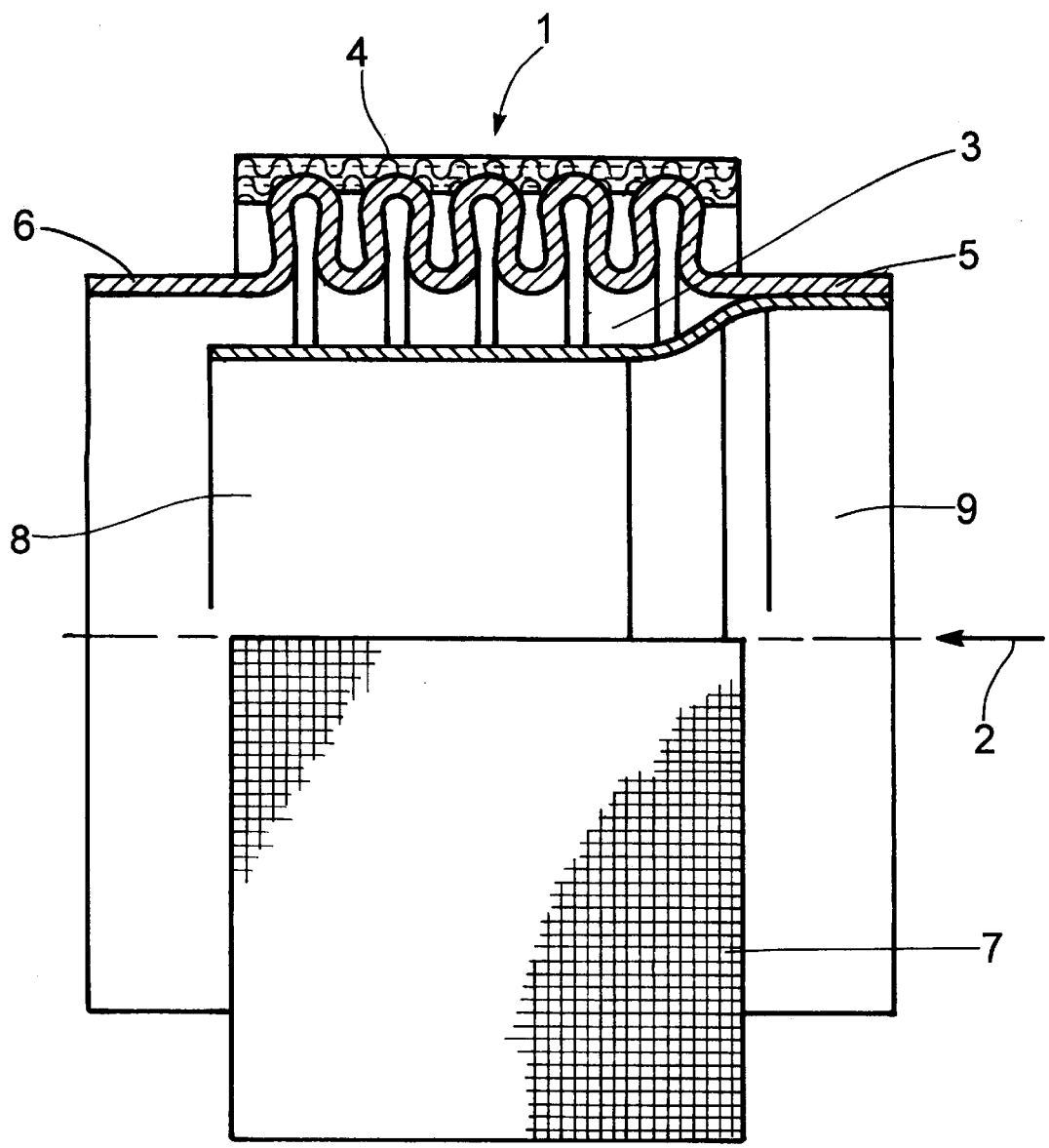
Figure 2:
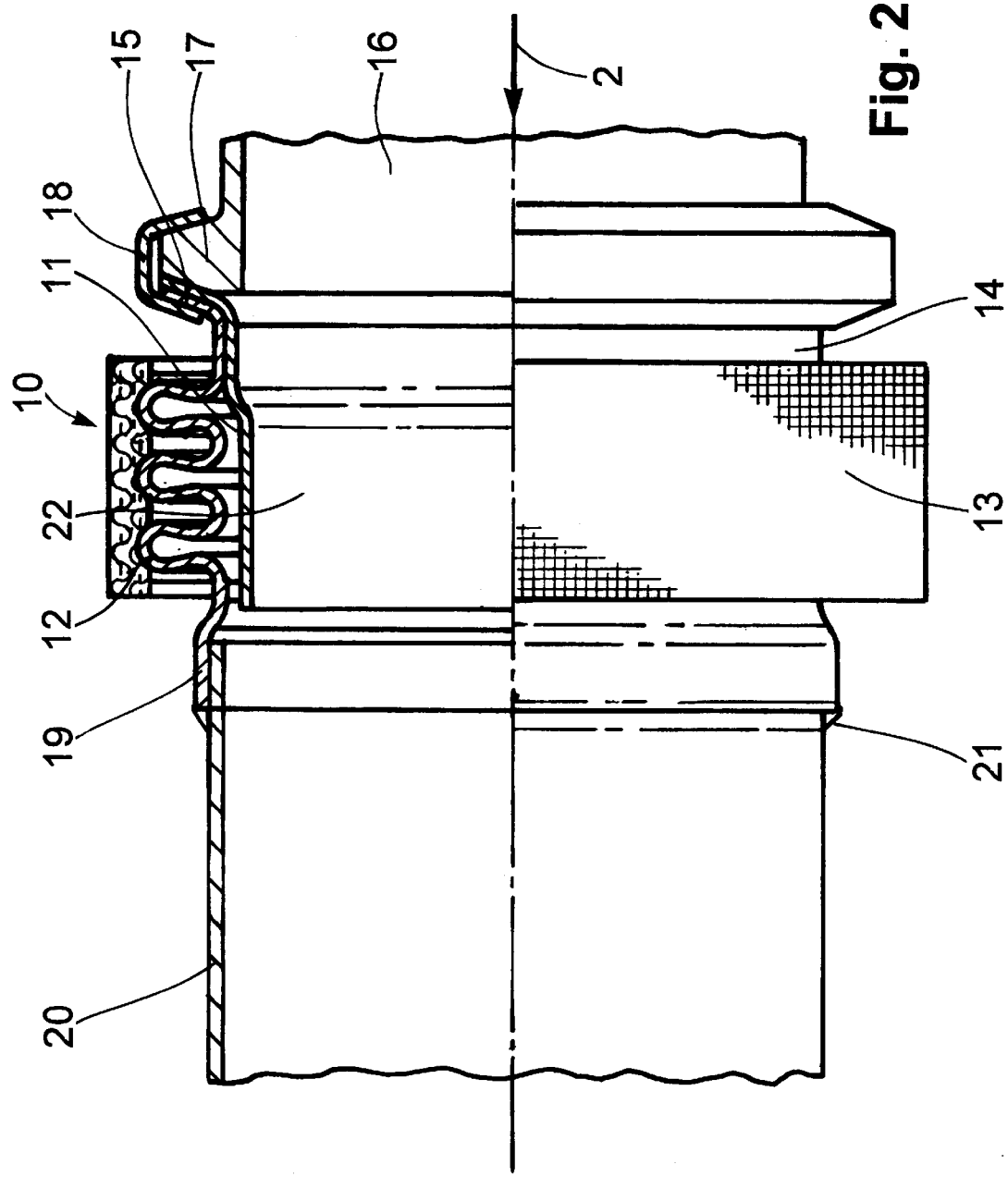
Figure 3:
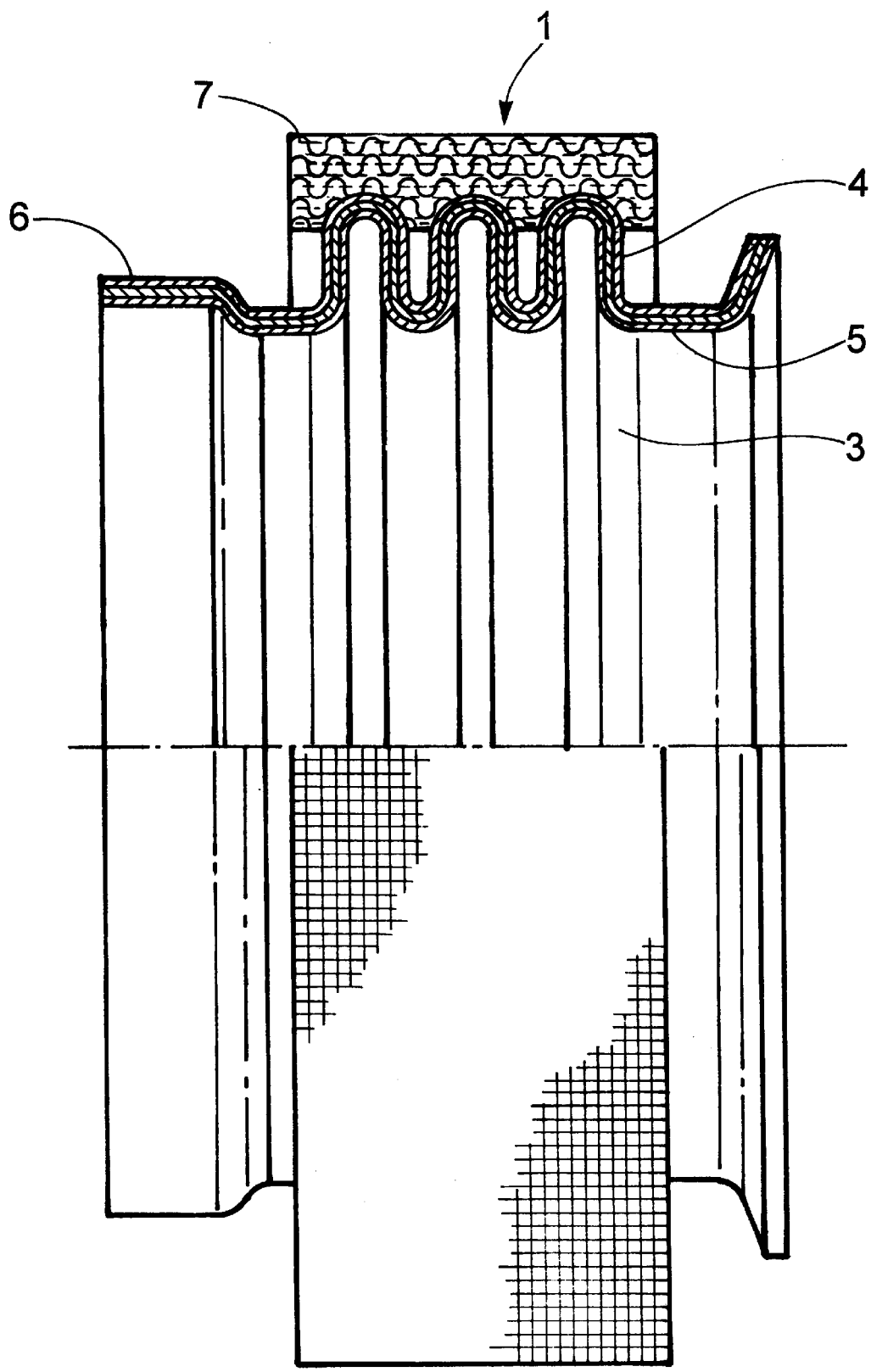

Further essential features and details of the invention emerge from the following description of embodiments which are represented in the drawings. In the drawings:

FIG. 1 shows a conduit element, partially in longitudinal section;

FIG. 2 shows a modification of the conduit element in accordance with FIG. 1. and FIG. 3 shows a conduit element as shown in FIG. 1, but wherein the corrugated sheathing hose has multiple walls of different materials.

FIG. 1 shows a conduit element, designated as a whole with reference numeral 1, for exhaust gas conduits of motor vehicles, which is flowed through with exhaust gas in the direction of the arrow 2.

The axially short conduit element basically comprises a metal corrugated sheathing hose 3 made of temperature- and corrosion-resistant material with five annular waves 4 sitting axially side by side, wherein the outer annular waves 4 transition into hollow cylindrical duct adapters 5, 6 formed in one piece. Via the free ends of these duct adapters 5, 6, the conduit element 1 can be welded with the continuing parts of the exhaust gas conduit (not shown).

A knitted jacket 7 is placed on the waves 4 of the corrugated sheathing hose 3, the internal cross section of the jacket being so closely dimensioned that it enters into force- and form-locking connection with the radially outward-lying crests of the waves 4, wherein the material of the knitted jacket 7 projects somewhat radially inward between the crests of the waves 4. In order to further support this form-lock, the knitted jacket 7 can be provided on the inside during the prefabrication with a corresponding wave-shaped impression, which due to the elasticity of the knitted jacket 7 does not hinder its installation by sliding on the corrugated sheathing hose.

By inner friction of the wire material forming the knitted jacket, by friction between corrugated sheathing hose 3 and knitted jacket 7, as well as the elastic motions of the waves 4 of the corrugated sheathing hose 3 against one another, the conduit element shown is in a position to prevent high frequency vibrations from propagation, thus to uncouple them with respect to the downstream-lying part of the exhaust gas installation. In order to increase this damping action further, it can be expedient to construct the corrugated sheathing hose 3 with multiple walls or multiple layers, so that a damping action also arises through friction between the individual corrugated sheathing hose layers, wherein this damping action can additionally be influenced by the choice of material for the individual corrugated sheathing hose layers. In like manner, the mixture of different wire and fiber materials can be provided for the knitted jacket 7.

As is apparent from the drawing (FIG. 1), a so-called inner protective tube 8 is further inserted into the corrugated sheathing hose 3, the tube 8 being fastened, for example by welding, on the exhaust gas entrance side with a radial expansion 9 there inside the duct adapter 5, and the tube 8 furthermore having such a radial spacing from the corrugated sheathing hose waves that it cannot come into contact with them. This internal protection tube 8 smooths the exhaust gas flow and furthermore forms for the corrugated sheathing hose 3 a protection against the high exhaust gas temperatures.

FIG. 2 depicts a modified embodiment of the subject according to FIG. 1 with a conduit element, designated as a whole with reference numeral 10, which is once again flowed through by exhaust gas in the direction of the arrow 2.

FIG. 3 shows an embodiment similar to FIG. 1, and using the same reference numerals, but without the internal protection tube 8. However, in FIG. 3 the corrugated sheathing hose 3 is constructed with multiple walls, here three walls, made from different materials, for the purpose discussed above in the Summary Of The Invention.

The conduit element basically comprises a metal corrugated sheathing hose 11, which here has only three annular waves 12. On the waves 12 of the corrugated sheathing hose 11, once again a knitted jacket 13 of the type already described is installed, for which to this extent reference is made to the description of the subject according to FIG. 1.

In accordance with FIG. 2, however, the corrugated sheathing hose 11 has a cylindrical connection end 14 formed in one piece, which is provided at its end with a conical flange 15. On the other hand, the continuing conduit element 16 has on its end an annular connection bulge 17, which has a conical connection surface fitting the flange 15. With the aid of a tightening clamp 18 with an essentially V-shaped cross section, flange 15 and bulge 17 are braced with each other gas tight.

On the other end of the corrugated sheathing hose 11, there is a hollow cylinder duct adapter 19 formed in one piece, similar to the embodiment in accordance with FIG. 1, which is somewhat expanded on its end, so that the continuing conduit element 20 can be inserted into the expansion and be welded at 21 with the duct adapter 19.

The embodiment in accordance with FIG. 2 also has an inner protective tube 22, which is bent on its end corresponding to the flange 15 and is there incorporated into the clamping connection with the bulge 17.

With both embodiments illustrated on the basis of FIGS. 1 and 2, the knitted jacket 7 or 13 can be further enclosed by a solid casing, in a manner not shown, which protects it from external impairment or from changing shape during operation. This casing can be formed by a woven or knitted jacket or also by at least one banding made of thin sheet metal, wherein the sheet metal can also have perforations similar to, for example, expanded metal.

What is claimed is:

1. A conduit element for uncoupling high frequency vibrations in connection with exhaust gas conduits of motor vehicle internal combustion engines, comprising a short segment of screw thread-shaped or annularly waved corrugated metal sheathing hose (3, 11) of high rigidity for insertion into an exhaust gas conduit and a knitted jacket (7, 13) installed force-locking or form-locking upon the waved corrugated metal sheathing hose segment, wherein the segment of corrugated metal sheathing hose, when inserted in an exhaust gas conduit, has a length and rigidity effective to uncouple vibrations which may occur in a frequency range of 1000 Hz to about 4000 Hz.

2. The conduit element according to claim 1, wherein a wave count of the waved corrugated metal sheathing hose (3, 11) lies in a range of two to seven waves (4, 12).

3. The conduit element according to claim 1, wherein an overall wall thickness of the corrugated metal sheathing hose (3, 11) lies in a range of 0.7 to 1.6 mm.

4. The conduit element according to claim 1, wherein the corrugated metal sheathing hose (3, 11) has on at least one end a cylindrical connection end (5, 6, 19) formed in one piece with the hose segment.

5. The conduit element according to claim 1, wherein the corrugated metal sheathing hose (3, 11) is constructed with multiple wall layers.

6. The conduit element according to claim 5, wherein the wall layers of the corrugated metal sheathing hose (3, 11) are made of different materials.

7. The conduit element according to claim 1, wherein the corrugated metal sheathing hose (3, 11) has an axial rigidity in a region of 1 KN/mm.

8. The conduit element according to claim 1, wherein the knitted jacket (7, 13) is constructed with multiple layers or as a hollow cylindrical knitted cushion.

9. The conduit element according to claim 8, wherein an inner wall of the knitted jacket (7, 13) has a profile adapted to a shape of wave crests of the corrugated metal sheathing hose (3, 11).

10. The conduit element according to claim 8, wherein the knitted jacket (7, 13) has a thickness in a range of 2 to 5 mm.

11. The conduit element according to claim 10, wherein the thickness of the knitted jacket (7, 13) is in a range of 2 to 3 mm.

12. The conduit element according to claim 1, wherein the knitted jacket (7, 13) is made of wires or fibers of different material.

13. The conduit element according to claim 12, wherein the wires or fibers are mixtures selected from the group consisting of wires of temperature- and corrosion-resistant steel, wires of copper, strands of glass fiber, strands of tungsten, and glass filaments.

14. The conduit element according to claim 1, wherein the corrugated metal sheathing hose (3, 11), proceeding from an end (5, 14) to be installed near the engine has an inner protective tube (8, 22) made of temperature-and corrosion-resistant material which does not contact inner waves of the corrugated metal sheathing hose (3, 11).

15. The conduit element according to claim 14, wherein the inner protective tube (8, 22) is fastened in or on the end (5, 14).

16. The conduit element according to claim 1, wherein a cylindrical connection end (14) formed in one piece on one end of the corrugated metal sheathing hose (11) is joined to a continuing part (16) of an exhaust gas conduit by a clamp connection.

17. The conduit element according to claim 16, wherein the connection end (14) is flanged on its end into an annular collar (15) conically directed onward from the waved segment of the corrugated metal sheathing hose, wherein the continuing part (16) of the exhaust gas conduit has an annular connection bulge (17) with a fitting conical seating surface for the collar (15), and wherein the collar (15) is braced with the bulge (17) by a tightening clamp (18) having an essentially V-shaped cross section.

18. The conduit element according to claim 1, wherein the knitted jacket (7, 13) is enclosed by a solid casing.

19. The conduit element according to claim 18, wherein the casing is formed by a weave, a knit, at least one banding of thin sheet metal, or a banding of thin, perforated sheet metal.

* * * * *